sText Office 2,996,415
Patented Aug. 15, 1961

2,996,415
METHOD OF PURIFYING SILICON CARBIDE
Karl M. Hergenrother, Burlington, Mass., assignor to Transitron Electronic Corporation, Wakefield, Mass., a corporation of Delaware
No Drawing. Filed Oct. 5, 1959, Ser. No. 844,170
8 Claims. (Cl. 148—1.5)

The present invention relates to a method of removing or controlling metallic impurities in silicon carbide. More particularly, the present invention relates to a method of growing silicon carbide in a pure or controlled form, which method is an improvement on the method disclosed in my co-pending application Serial No. 760,287, filed September 8, 1958.

One of the major impurities in silicon carbide, and in particular in black P type silicon carbide, is aluminum. In addition, traces of other metallic impurities such as zirconium, and titanium are found in silicon carbide. As disclosed in my copending application, chromium not only acts as a solvent for silicon carbide but also to a limited extent, removes aluminum. Thus, the use of chromium as silicon carbide solvent has certain advantages. I have, however, discovered that by adding to the chromium, oxygen either as an oxide or as elemental oxygen, substantially improved results can be obtained. The oxygen apparently forms insoluble oxides with the impurities in the chromium solvent and thereby removes these impurities from the silicon carbides. The purified silicon carbide may be removed thereafter from the solvent by such conventional techniques as zone passing or crystal growing.

It is therefore an object of the present invention to provide a method for purifying or controlling the degree of impurities in silicon carbide whereby desired resistivity gradients may be effected in regrown silicon carbide crystals. It is also an object of the present invention to provide a commercially useful method by which silicon carbide crystals may be grown to a preselected and controlled degree of purity.

In the present invention impure silicon carbide crystals or crystals having unknown or undesirable impurities are melted in a suitable silicon carbide solvent. Chromium has been found to be a preferred suitable solvent. Silicon would also appear to be a suitable solvent. Oxygen, either as an oxide or elemental oxygen is introduced into the silicon carbide solvent. Preferably, oxygen may be added to the chromium solvent as chromium oxide in one of its several forms including $Cr_2O_3$, $CrO_3$, $CrO_2$, etc. Normally chromium oxide in the form $Cr_2O_3$ is used.

Oxygen may also be introduced into the chromium by refining the chromium under conditions favorable to oxygen inclusion. Oxygen may also be added to the chromium during the actual growing of the silicon carbide crystals from a melt of chromium by adding elemental oxygen to the inert atmosphere in which the silicon carbide is normally grown from chromium. Such oxygen when thus exposed to the chromium forms chromium oxide which is subsequently dissolved in the melt.

The minimum amount of oxygen which may be included in the chromium solvent in the form of elemental oxygen or oxide is determined by the results desired. An upper limit of oxygen which may be included in the chromium solvent is determined by the amount which causes precipitation of chromium oxide from the chromium solvent. Such precipitation inhibits growth of silicon carbide from the chromium solvent. As chromium oxide is soluble in chromium only to a limited extent, it is therefore desirable to limit the ratio of chromium oxide to chromium to prevent such precipitation. Thus, for example, a limiting range of oxygen dissolved in chromium may range in weight between .001 to 10% of the weight of the chromium solvent.

Silicon carbide having an unknown or undesired quantity of impurities, principally aluminum, is dissolved in a chromium melt at a temperature of approximately 1500° C. to 1600° C. The silicon carbide is then regrown as a crystal from the melt by one of several methods. In one method a seed of silicon carbide is withdrawn from the melt allowing silicon carbide to regrow upon it in a pure or to a substantially controlled degree of purity. In a second method the melt of silicon carbide and a solvent such as chromium containing oxygen is formed as a zone in a sandwich of silicon carbide materials with the sandwich having a temperature gradient established across it. The zone will then pass through the sandwich, regrowing the silicon carbide crystal on one side in substantially pure or controlled form.

The elemental oxygen or oxide in the chromium combines with metallic impurities having higher heats of formation than chromium oxide at the temperature, at the interface, at which silicon carbide is grown from the chromium melt and thereby removes the impurities from the silicon carbide. In addition, it is probable that the chromium act as a getter to remove traces of silicon or carbon impurities in the silicon carbide. Normally the temperatures at the interface are in the range of 1500° C. to 1600° C.

While aluminum is a substantial impurity in silicon carbide, particularly in black P type, other metallic impurities such as zirconium, and titanium may also be removed.

The heat of formation of a particular metal is the heat at which oxides are formed when burning the particular metal in oxygen. The more stable oxides have higher heats of formation because of their greater affinity for oxygen. A typical reaction in the removal of aluminum impurities from silicon carbide while dissolved in a chromium melt is represented by formula:

$$Cr_2O_3 + 2Al \rightarrow Al_2O_3 + 2Cr + 109 \text{ kilocalories}$$

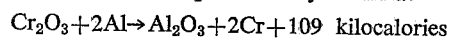

This reaction is substantially unidirectional because of the substantially greater heat of formation of aluminum oxide than chromium oxide. Other impurities such as titanium, and zirconium have similar reactions.

In one specific example of this invention a piece of chromium containing approximately .5% $Cr_2O_3$ is sandwiched between a piece of N type silicon carbide and a piece of P type silicon carbide. The sandwich is subsequently secured in a furnace between two carbon plates one on the outer surface of each of the N and P type silicon carbide pieces. An inert atmosphere is introduced in the furnace and the temperature of the carbon plate against the P type piece is raised to 1800° C. and that against the N type piece raised to 1600° C. The chromium layer melts forming a molten chromium zone. This molten chromium zone dissolves the silicon carbide on the hotter side and regrows this silicon carbide on the cooler side. Thus the chromium melt moves through the sandwich in accordance with conventional zone passing techniques. The resulting composition is a layer of N type silicon carbide with an adjacent layer of regrown silicon carbide from which impurities, and particularly aluminum, has been removed from the original P type piece. It has been found that diodes made from this construction have inverse voltages in excess of 200 volts.

It has also been found by carefully controlling the amount of oxygen in the chromium, it is possible to control the resistivity gradients in the regrown crystals and it is also possible to thereby form junctions. Thus, for example, if in the preceding example the chromium contained but a small amount of oxygen compared with the aluminum dope in the P type slice of silicon carbide, the regrown silicon carbide redeposited at the junction will be of a high resistivity type. The first part grown fill have the aluminum removed. But since the oxygen will have been consumed the remainder of the regrown silicon carbide will have its initial resistivity. The resistivity thus drops rapidly at points further into the regrown silicon carbide.

Also contemplated is a method for effecting a type reversal by controlling oxygen content of the chromium during the growing process. Such a modification would appear to be particularly adapted for growing silicon carbide from a crucible contained melt of chromium.

The foregoing example may be varied widely in its specific parameters. Thus, for example, silicon carbide may be formed in pieces having a thickness of for example from .005 to .020 or greater of an inch in thickness while the chromium may vary from .0005 to .005 of an inch in thickness with a thickness of perhaps .002 or .003 of an inch being preferred. The thicknesses are limited only by the edge effects of the sandwich. The length of time the sandwich may be heated is determined by the amount of passing desired. In many instances 3 or 4 thousandths of an inch has been found to be a sufficient amount of zone passing.

The specific embodiment above describes zone passing of chromium through silicon carbide layers in which one layer is P type and the other N type. Also contemplated is the passing of a chromium zone through a sandwich in which both layers are P type or alternately a sandwich in which both layers are N type. In the latter case, the silicon carbide will of course be doped with materials other than aluminum, which is a P type dope. Further examples of the process contemplated by this invention are suggested by my copending application.

What is claimed is:

1. In a process of controlling the semiconductive impurity content of silicon carbide the steps of dissolving silicon carbide having impurities dissolved therein in a chromium melt having an oxygen content in a form suitable for combination as an oxide with said impurities, said oxygen in quantities sufficient to combine with said impurities but weighing substantially no more than 10% of said chromium melt, and thereafter reforming from said melt said silicon carbide in a solid segregated state of selected semi-conductive purity.

2. In a process of controlling the semiconductive impurity content of silicon carbide the step of dissolving silicon carbide having impurities dissolved therein in a silicon carbide solvent selected from a group consisting of silicon and chromium and having an oxygen content in a form and quantity at least sufficient and suitable for combination as an oxide only with said impurities but weighing substantially no more than 10% of said chromium melt, and thereafter reforming from said melt said silicon carbide in a solid segregated state of selected semiconductive purity.

3. In a process of controlling the aluminum content in semiconductive type silicon carbide the steps of dissolving silicon carbide having aluminum therein in a chromium melt at a temperature of between substantially 1500 and 1600 degrees centigrade having an oxygen content in a form suitable for combination with said aluminum as aluminum oxide, said oxygen in quantities sufficient to combine with said impurities but weighing substantially no more than 10% of said chromium melt, and thereafter reforming from said melt said silicon carbide in the solid segregated state of selected semiconductive purity.

4. A process as set forth in claim 3 wherein said oxygen is in the form of chromium oxide.

5. A process as set for in claim 3 wherein said oxygen is introduced into the solution by reacting elemental oxygen with a portion of the chromium solvent.

6. In a process of controlling metallic semiconductive impurity content in semiconductive silicon carbide the steps of dissolving silicon carbide in a chromium melt containing chromium oxide in a dissolved form only and in a quantity sufficient to combine with said impurity and thereafter regrowing said silicon carbide in a semiconductive form from said melt whereby metallic impurities of the type which form oxides having a higher heat of formation than chromium oxide at the temperature at the interface at which said silicon carbide is regrown, react with said chromium oxide to form metallic oxides insoluble in said silicon carbide.

7. A method of growing silicon carbide crystals of precisely controlled semiconductive composition comprising arranging a sandwich of three layers with the outer layers comprising silicon carbide and the intermediate layer of chromium having an oxide in sufficient quantity to combine with impurities in said silicon carbide layers dissolved therein, establishing a temperature gradient across the sandwich sufficient to melt the intermediate layer whereby said intermediate layer forms a migrating liquid which dissolves the silicon carbide on the hotter side and reforms it as a single crystal silicon carbide in semiconductive form on the other side with metallic impurities in said silicon carbide absorbed as oxides in said intermediate layer.

8. A method of controlled removal of metal semiconductive impurities from silicon carbide comprising forming said silicon carbide as a solute in a silicon carbide solvent with oxygen introduced into said solvent in sufficient quantity to combine with said impurities and in a form selected from a group consisting of an oxide and elemental oxygen for forming oxides therein and thereafter reforming said silicon carbide into a solid state and oxidizing said impurities to form oxides having higher heats of formation than the oxides of said solvent and then segregating said solid silicon carbide from said impurity oxides.

References Cited in the file of this patent

UNITED STATES PATENTS

| | | |
|---|---|---|
| 858,325 | Becket | June 25, 1907 |
| 906,854 | Becket | Dec. 15, 1908 |
| 1,733,752 | Ramage | Oct. 29, 1929 |
| 1,835,925 | Becket | Dec. 8, 1931 |
| 2,205,386 | Balke | June 25, 1940 |
| 2,854,364 | Lely | Sept. 30, 1958 |